United States Patent
Bretschneider et al.

(10) Patent No.: US 6,984,449 B2
(45) Date of Patent: Jan. 10, 2006

(54) PELLETS AND PROCESS FOR PRODUCTION THEREOF

(75) Inventors: Frank Bretschneider, deceased, late of Radeberg (DE); by Karola Bretschneider, legal representative, Radeberg (DE); Wolfgang Kempe, Dresden (DE); Marcel Minor, Wageningen (NL); Marijke Adamse, Ede (NL)

(73) Assignee: IPC Process Center GmbH & Co., Dresden (DE)

( * ) Notice: Subject to any disclaimer, the term of this patent is extended or adjusted under 35 U.S.C. 154(b) by 0 days.

(21) Appl. No.: 10/741,608

(22) Filed: Dec. 18, 2003

(65) Prior Publication Data

US 2004/0201116 A1    Oct. 14, 2004

Related U.S. Application Data

(63) Continuation-in-part of application No. 10/418,570, filed on Apr. 17, 2003.

(30) Foreign Application Priority Data

Dec. 19, 2002  (DE) ............................... 102 60 658
Feb. 28, 2003  (DE) ............................... 103 09 777

(51) Int. Cl.
   *B32B 9/00*   (2006.01)
   *A61K 9/62*   (2006.01)
(52) U.S. Cl. ................... 428/402.2; 264/4.1; 264/4.33; 428/402.21; 424/461; 424/469
(58) Field of Classification Search ................ 264/4.1, 264/4.33; 428/402.2, 402.21; 424/461, 424/469
   See application file for complete search history.

(56) References Cited

FOREIGN PATENT DOCUMENTS

EP         1214892      *  6/2002

* cited by examiner

*Primary Examiner*—Samuel A. Acquah
(74) *Attorney, Agent, or Firm*—Kenyon & Kenyon

(57) ABSTRACT

The invention relates to pellets and a production process therefor. Pellets comprise at least one oily component, which is either an active component alone or comprises such an active component. The aim of the invention is to ensure that such active components can be provided at elevated concentration in a long-term stable form for subsequent administration or further processing using such inventive pellets. The at least one oily oxidation-sensitive or else readily volatile active component is distributed homogeneously and discretely in a matrix and encapsulated without a core with at least one water-soluble polysaccharide as filmforming agent. The individual pellets have a respective particle size of at least 100 $\mu$m, preferably of at least 300 $\mu$m.

55 Claims, No Drawings

PELLETS AND PROCESS FOR PRODUCTION THEREOF

CROSS-REFERENCE TO RELATED APPLICATION

This application is a continuation-in-part of U.S. application Ser. No. 10/418,570, filed on Apr. 17, 2003.

FIELD OF THE INVENTION

The invention relates to pellets which comprise at least one oily component which is itself alone an active component or comprises at least one such active component.

DESCRIPTION OF RELATED ART

Generally, such oily and/or active components are frequently oxidation-sensitive or readily volatile, so that over greater or lesser time periods the proportion of such active components is decreased or these components lose their activity.

For this reason, such components must be protected.

The invention can be used for the most varied types of application. Thus, the inventive pellets, by appropriate choice of suitable active components, can be used in animal and human nutrition, as a dosage form for pharmaceuticals, for cleaning composition additives, as crop protection agents and other fields.

Thus, it is known from the prior art to emulsify oily components, which can additionally also comprise active components, and use such an emulsion immediately. However, this is only possible over a limited time period, since the long-term stability of such emulsions is not unlimited and, moreover, preservatives frequently cannot be used.

For this reason, the emulsions are processed to form powders. This is performed, as is also described in EP 0 598 920 B 1, by spray-drying an emulsion. According to the teaching which follows from there, an emulsion is produced with an oil phase and a very specific soybean hemicellulose which is water-soluble as emulsifier. From this emulsion, a powder is produced in the form of microcapsules by spray-drying, and in this process in the microcapsules, in addition to the oily phase, other or further active components can also be present.

Such a powder which is formed from corresponding microcapsules, however, achieves a limited loading, and therefore has a low content of the respective active component, since the outer casing must be sufficiently thick and sealed to prevent effects due to ambient moisture or the volatilization of active components from the microcapsules.

Furthermore, due to the process, during the production of powder by spray-drying, an unwanted predominantly thermally caused adverse effect on the active components is unavoidable, so that at least their activity is reduced.

However, this fact also affects the solution described in EP 1 214 892 A2. In this case, however, it is additionally disadvantageous that the respective active component, whether it be solely an oily component or an oily component additionally with a further active component, is additionally encapsulated around an inert core, so that accordingly the content of active components present in such capsules is reduced per unit volume and in relation to the total mass.

Furthermore, the conventional powders produced from emulsions have a limited mechanical strength, so that in particular during transport and storage high abrasion occurs, or even fracture of the capsules can occur, and accordingly volatilization of, or unwanted effects on, the components can occur.

The powders produced by spray-drying are only free-flowing with limitations, so that an exact dosage can only be achieved with great complexity.

If the powder particles are to be coated with an outer protective coating to improve the abovementioned properties, because of their very high surface areas, a very large amount of coating material is required. Thus, for the development of sealed coatings, mass to ratios of powder and coating material up to 1:1 may be necessary, which leads to increased production costs and a reduction in the proportion of active component to the volume of the mass.

SUMMARY OF THE INVENTION

Accordingly, it is an object of the invention to provide oxidation-sensitive active components which are also in addition or alone readily volatile in the form of oils and/or active components additionally present in such oils which are long-term stable at elevated concentration for subsequent administration or further processing.

These and other objects of the invention are achieved with a pellet in which, in a homogeneous discrete distribution, at least one oily oxidation-sensitive and/or readily volatile active component and/or such an active component present in an oily component is encapsulated without a core in a matrix which comprises at least one water-soluble polysaccharide as film-forming agent and has a particle size of at least 100 $\mu$m. The inventive pellets can be produced by a process for producing pellets in which at least one oily component is present in a matrix in encapsulated form without a core alone or with an additional active component and individual capsules are arranged discretely and homogeneously distributed; in which an aqueous emulsion is produced which, in addition to at least one oily component, comprises at least one water-soluble polysaccharide as film-forming agent, in which emulsion the oily component is present in finely divided form, a matrix-forming substance or mixture of substances is added to this emulsion to set a doughy consistency and pellets are produced therefrom. Advantageous further developments and refinements of the invention will now be described herein.

DETAILED DESCRIPTION OF THE INVENTION

Compared with the solutions known from the prior art, the inventive pellets are distinguished in that the respective active components are present in them at high concentration and nevertheless are reliably protected.

For this, the active components are encapsulated in a homogeneous discrete distribution in a matrix which comprises a water-soluble polysaccharide as film-forming agent. In the individual pellets, no inert cores whatsoever are present. They each have a particle size of at least 100 $\mu$m, preferably of at least 300 $\mu$m.

The high content of active components present in such pellets can be achieved, in particular, by the likewise inventive production process, with more detailed descriptions on this following below.

The inventive film-forming polysaccharide to be used should be present at at least a proportion of 0.5% by mass. The content of these film-forming agents can, however, also be chosen to be significantly greater and be up to 60% by mass. In particular, the film-forming agent used ensures that the one or else optionally more enclosed component(s) in the matrix can be incorporated in the form of discretely dispersed capsules.

Polysaccharides which have proved to be particularly suitable for this are, in particular, water-soluble hemicellulose, which can be produced for example from soybeans or rapeseed, and/or modified starch and/or pectin compounds.

The water-soluble polysaccharides are harmless physiologically and to the environment.

In addition, compared with pure natural products, for example gum arabic, they can be provided in virtually identical quality and with virtually constant costs, that is to say independently of climatic conditions which affect the costs of natural film-forming substances.

Furthermore, a markedly higher consumer acceptance is provided, compared with the gelatin also customarily used for this.

For the matrix, non-water-soluble carbohydrates can be used. These can be selected from starches or cellulose components.

Different starches can be used to develop the matrix, in which case malt starch or else cereal starch is particularly suitable for this. These can each be used alone or else in combination with one another.

For the matrix formation, a suitable cellulose component is in particular microcrystalline cellulose (MCC).

The mass fraction of starch can be up to a maximum of 90% by mass. In addition to said organic components, a matrix can also be formed from inorganic components, or can comprise such components.

Suitable inorganic substances are, for example, kaolin, $CaCO_3$, Cas, silicates, clay, bentonite, diatomaceous earth or aluminum oxide, which can also be used as a mixture.

The inorganic components should also be as far as possible non-water-soluble.

In addition, water-soluble carbohydrates can be used for the matrix material in a continuous spray granulation process. Suitable water-soluble carbohydrates include different oligosaccharides with different chain lengths, with dextrin begin preferred, and maltodextrin being more preferred.

With the use of water-soluble carbohydrates for the matrix, the particle size of the pellets is preferably between 200 and 1,500 μm, and a content of an encapsulated active component more than 15% by mass of a pellet is preferred.

In addition, however, mono-, di- or trisaccharides may also be present, in which case here too differing mass fractions which can be above 50%, by mass can be maintained.

In addition to neutral oily components, that is to say those which do not have an active effect, oily components having an active effect can also be used for producing inventive pellets. The content of this component should preferably be at least 15% by mass. Components which have proved to be advantageous are, in particular, the various fruit oils, but also fruit oil extracts. Thus, the oily component can be formed, for example, from orange oil and/or lemon oil. Merely the aromatic flavor and odor notes of these oily components can achieve the desired active effect alone, or if appropriate also together with additional active components.

Additional active components which can be used, however, are also synthetic or natural colorings. Thus, for example, carotene, preferably betacarotene, canthaxanthin or astaxanthin can be used for this, which, in addition to the coloring action, have the relevant known additional actions.

Furthermore, active components which can also be used as active component are vitamins, preferably oil-soluble vitamins, for example vitamin A acetate, a combination of these vitamins with carotene also being possible.

In addition to the vitamins, however, other pharmaceutically active substances can also be used as active component. Other possible active components are various insecticides/biocides.

For subsequent applications of the inventive pellets in cleaning agents or also, if appropriate, in cosmetics, differing aroma substances having correspondingly pleasant flavor notes can be used, if appropriate together with surfactants.

For foods, flavorings having flavor and/or odor notes can be used.

However, the active component can also be unsaturated fatty acids, for example alpha-omega-polyunsaturated fatty acids.

Active components additionally present in the capsules together with the oily component need not obligatorily be oil-soluble. They can also be present in dispersed form, as small crystals in an oily component. Thus, there is the possibility of dispersing unstable vitamins, for example vitamin K (MSBC), in fine crystalline form in an oily component and encapsulating them in the pellets correspondingly with the oily component.

The proportion of the volume occupied by the capsules embedded in the matrix should be kept above 10%, preferably above 20%. However, there is also the possibility of setting the corresponding volume fraction beyond this and accordingly significantly increasing the proportion, that is to say the loading with active components, in the pellets.

The water content in the finished pellets should be kept less than 10% by mass.

According to an embodiment of the invention, the inventive pellets, in contrast to the powders which are produced in the prior art by spray-drying, are obtained by a combination of producing emulsion with subsequent direct pelleting or extrusion.

In this case, for producing the emulsion, at least one starch, one oily component, one water-soluble polysaccharide as film-former and water are used.

Starch, for example, can additionally be added to the resultant emulsion, in order to increase the viscosity and to establish a doughy consistency.

In this state, preferably an extrusion can be performed, in which case, from the respective extruder, the still slightly moist pellets can then be removed. The pellets can if appropriate be further mechanically reprocessed, preferably rounded.

Furthermore, redrying can follow, in order to reduce the water content further, and there is also the possibility of providing the individual pellets with a protective coating which preferably forms moisture protection and if appropriate can also prevent the pellets from sticking together.

Surprisingly, it has been found that an emulsion in which an oily component is distributed in at least a finely dispersed manner and containing a water-soluble polysaccharide as film-forming agent, by, for example, adding viscosity-increasing further starch, during an extrusion, the capsules formed which comprise the oily component and if appropriate further active components are embedded into the matrix and are not destroyed in the course of this. Furthermore, a homogeneous, that is to say a very uniform, distribution of the small capsules within the matrix of the individual pellets can be achieved. Depending on the number and correspondingly the proportion of the capsules embedded into the matrix, a greater or lesser loading, that is to say a corresponding content of active components, can be established, which can be kept at up to 20% by mass and even above.

In the extrusion, relatively fine dies can also be used, so that the pellets, after the extrusion, orthogonally to the direction of extrusion can have diameters in the region around 1 mm.

Obviously, pellet cross sections are achievable which are also larger, and if appropriate also somewhat below 1 mm.

In the extrusion, in particular a temperature lower than that used in spray-drying can be employed, so that the active components used as a result are also less adversely affected. Fewer evaporation losses occur.

In the extrusion, relatively low pressures can be employed. Also by this means a gentle treatment of the encapsulated active components can be achieved and can ensure that the active components are protected from the unwanted external influences and can be kept sealed safely within the matrix of the pellets. The starch and/or cellulose component, for example, essentially used for forming the matrix is safe physiologically and for the environment and is also predominantly odor- and taste-neutral.

Furthermore, the inventively produced pellets also have a good mechanical stability, so that a reduced abrasion can be achieved.

The invention will be described in more detail below by way of example.

EXAMPLE 1

To produce an emulsion, 10 kg of modified starch (Hicap) were intensively mixed with 30 kg of water, 8 kg of orange oil and 2 kg of malt starch. This was followed by homogenization at approximately 200 bar in a Niro homogenizer. The emulsion thus prepared was brought to a doughy consistency by adding 12 kg of cereal starch powder with subsequent mixing. The resultant mixture was then extruded using a Fuji-Paudal low-pressure extruder. A pellet cross section of 1.2 mm was established using appropriate extruder dies.

The resultant pellets were then rounded and then redried in a fluidized bed until a water content of about 4% was maintained. The air was dried in a closed circuit by directing the air above a silica gel water-absorbent and returning the air into the fluidized bed.

The loss of orange oil as active component was 8%, so that the mass fraction of orange oil in the finished pellets could be maintained above 18% by mass.

EXAMPLE 2

To produce the emulsion, 6 kg of hemicellulose as soybean-based film-forming agent, 6 kg of malt starch, 30 kg of water and 36 kg of orange oil were mixed intensively with one another. This preemulsion was then likewise homogenized at approximately 200 bar in a Niro homogenizer.

Then 6 kg of malt starch and 9 kg of cereal starch were added to this homogenized emulsion and mixed together in such a manner that a doughy extrudable consistency was established. This was then likewise extruded and dried as already described in example 1.

The water content, likewise after drying had been performed, was approximately 4% by mass, and the orange oil content was maintained at 54% by mass, a loss of only 2% of orange oil being recorded.

EXAMPLE 3

In this case, 16 kg of modified starch (Hicap 100), 27.2 kg of water, 6.86 kg of vitamin R acetate oil were intensively mixed at a temperature of 60° C. and then the finished emulsion was obtained as in the examples using subsequent homogenization. 2.5 g of malt starch and 7.6 kg of cereal starch were added to this emulsion and then an extrusion was again performed with subsequent rounding and redrying to a water content of approximately 4% by mass.

EXAMPLE 4

To produce an emulsion, 6 kg of soybean-based hemicellulose, 12 kg of malt starch, 30 kg of water containing 36 kg of nonanionic acid were mixed intensively with one another at temperatures between 0 and 5° C. and then likewise homogenized. The doughy consistency was set by adding 9 kg of cereal starch and again this was followed by rounding and redrying to a water content of approximately 4% by mass.

The nonanionic acid was safely encapsulated in the pellets and no loss was observed.

EXAMPLE 5

In this case, 125 g of pulverulent malt starch were mixed with 125 g of soybean-based hemicellulose in powder form. This powder mixture was dissolved in 1900 g of demineralized water and mixed. 1350 g of an oil having a high content of polyunsaturated fatty acid esters were added to this solution and mixed highly intensively. The oil had an iodine value of 170. This preemulsified mixture was homogenized and further emulsified using a Niro two-stage homogenizer at pressures of 200 bar and 220 bar.

The majority of the oil droplets in the resultant emulsion had a particle size of 1.4 μm.

A mixture of 1289 g of a corn starch (Cerestar) and 1289 g of microcrystalline cellulose was then added to the emulsion which had a mass of 2380 g and additionally 496 g of water were added and mixed with one another. In this manner, a doughy consistency could be achieved having a moisture content of 36% by mass.

This doughy mass was extruded at low pressure using a Fuji-Paudal extruder, the extruder dies having a diameter of 0.8 mm.

The extruded pellets were then dried in a fluidized bed to a water content of 3% by mass.

The dried pellets had an oil content of 25% by mass which was monitored over a period of four weeks at room temperature with open storage under atmospheric conditions. After these four weeks, an iodine value of 162 was determined. This showed that virtually no oxidation was found during the production and subsequent storage. The free fat content was determined at less than 0.1% by mass.

EXAMPLE 6

350 g of a pulverulent soybean-based hemicellulose were mixed with 700 g of malt starch and dissolved in 2450 g of demineralized water. 1500 g of orange oil were added to this solution and this was followed by highly intensive mixing. The mixing was kept at a temperature below 10° C.

The preemulsified mixture was homogenized using a Niro two-stage homogenizer at pressures of 200 bar and 220 bar. The majority of the oil droplets present in the emulsion had a particle size of 0.8 μm.

950 g of microcrystalline cellulose (Vivapur) and 100 g of wheat starch were added to 3950 g of this emulsion and mixed with one another so that a doughy consistency having a moisture content of 39% by mass was achieved. This was followed by extrusion which was followed by spheronizing and drying in a fluidized bed.

The dried pellets were stored open under the effects of air at 40° C. and a relative humidity of 35%. The contents of cis- and trans-limonene epoxide, carveols and carvones were determined at the start and end of storage. The measured values obtained are shown in table 1 below.

TABLE 1

| Oxidation component | Concentration of the component being oxidized in ppm of orange oil at start | Concentration of the component being oxidized in ppm of orange oil after 3 months at 40° C./35 percent relative humidity |
| --- | --- | --- |
| Cis-limonene epoxide | 225 ppm | 2000 ppm |
| Trans-limonene epoxide | 150 ppm | 1100 ppm |
| Carveols | 75 ppm | 1300 ppm |
| Carvones | <10 ppm | 900 ppm |

EXAMPLE 7

The extrudable mass having a doughy consistency which was obtained according to example 3 was added, at a mass of 10 kg, to a Glatt granulator and additionally 1 kg of Cerestar corn starch was added.

The granulation was carried out over a period of five minutes and the resultant granules were fed to a spheronizer, likewise from Glatt. The spheronized pellets were then redried in a fluidized bed until a moisture content of 3% by mass was achieved.

EXAMPLE 8

In this example, 0.5 kg soybean-based cellulose were mixed with 2 kg maltodextrin and slowly dissolved in 12.5 kg demineralised water.

7.5 kg of the same quality maltodextrin was added slowly to this mixture together with 3 kg polyunsaturated oil obtained from C. N. Schmidt B. V. Amsterdam, Netherlands having a iodine value of 170 and preemulsified with a high speed mixer to form 22.5 kg preemulsion. This preemulsion was homogenized with a high pressure two stage homogenizer at a pressure of 250 bar and 275 bar.

The mixture was fed to a fluid bed WSA 225 direct pelletizing pilot installation manufactured by Glatt GmbH.

The oxidation product hexanal was determined during a storage trial where the pellets were exposed to air at 37° C. Over a period of 4 weeks the hexanal content showed an increase of less than 20%.

The pellets had a particle size of between 250–355 μm.

Also, pellets of a particle size of between 800–1118 μm were prepared using the same ingredients and process. All the pellets prepared had an oil content of more than 23% Wt/Wt and a hexanal content of less than 0.5 mg/kg Oil.

EXAMPLE 8a

The same process as in example 8 was used to prepare an encapsulated Orange Oil pellet according to an embodiment of the invention. However, instead of 3 kg of the polyunsaturated oil, 2 kg Orange Oil was added, having a limonene content of 63%. The mixture was homogenized under the same conditions as in example 8.

The mixture was fed to a fluid bed WSA 225 direct pelletizing pilot installation manufactured by Glatt GmbH.

The pellets had a mean particle size of between 800–1100 μm and a limonene content of 12% wt/wt and an orange oil content of 19% wt/wt. Less than 5% loss of orange oil occurred during this direct pelleting process and no oxidation of the limonene occurred during the pelleting and drying process.

EXAMPLE 9

125 g of a pulverulent soybean-based hemicellulose were dissolved in 1250 g of demineralized water in a mixture with 125 g of malt starch.

1250 g of arachidonic acid were added to this solution and mixed highly intensively.

The preemulsified mixture was homogenized in two stages at pressures of 200 bar and 350 bar. The individual oil emulsion particles essentially had a size of 0.8 μm.

645 g of this emulsion were then mixed with 2000 g of 25 kaolin (GTY Clay) and 600 g of microcrystalline cellulose and an extrudable doughy consistency having a water content of 28% by mass was achieved.

The mass was then extruded, and spheronization and drying in a fluidized bed were carried out until a water content of 3% by mass was achieved.

The content of encapsulated arachidonic acid was 8.5% by mass.

During storage in air at room temperature, no losses or impairment of arachidonic acid were observed.

What is claimed is:

1. A pellet in which, in a homogeneous discrete distribution, at least one oily oxidation-sensitive component is encapsulated without a core in a matrix which comprises at least one water-soluble polysaccharide as film-forming agent and whereby said pellet has a particle size of at least 100 μm.

2. The pellet according to claim 1, wherein the water-soluble film-forming polysaccharide is present at at least 0.5% by mass.

3. The pellet according to claim 1, wherein the oily oxidation-sensitive component is present at at least 15%-by mass.

4. The pellet according to claim 1, wherein it has a particle size of at least 300 μm.

5. The pellet according to claim 1, wherein the water-soluble polysaccharide is hemicellulose and/or a modified starch.

6. The pellet according to claim 1, wherein at least one non-water-soluble carbohydrate is present in the matrix.

7. The pellet according to claim 6, wherein the nonwater-soluble carbohydrate is a starch and/or a cellulose component.

8. The pellet according to claim 7, wherein the non-water-soluble carbohydrate is a cereal starch, a microcrystalline cellulose, malt starch or a mixture thereof.

9. The pellet according to claim 1, wherein mono-, di- or trisaccharides are present in the matrix.

10. The pellet according to claim 1, wherein an inorganic component which is not soluble in water is present in the matrix.

11. The pellet according to claim 10, wherein the inorganic component is or comprises kaolin, $CaCO_3$, CaS, a silicate, aluminum oxide, clay, bentonite or diatomaceous earth.

12. The pellet according to claim 1, wherein the oily component is one of an aromatic fruit oil and a fruit oil extract.

13. The pellet according to claim 1, wherein the active component is a coloring.

14. The pellet according to claim 1, wherein the active component is a flavoring.

15. The pellet according to claim 1, wherein the active component is an unsaturated fatty acid.

16. The pellet according to claim 1, wherein the active component is an active pharmaceutical compound or comprises an active pharmaceutical compound.

17. The pellet according to claim 1, wherein the active component is an insecticide/biocide.

18. The pellet according to claim 1, wherein the active component is soluble or dispersible in an oily component.

19. The pellet according to claim 1, wherein the capsules occupy a volume of at least 10% in the pellet.

20. The pellet according to claim 1, wherein the water content is less than 10% by mass.

21. The pellet according to claim 1, wherein at least one water-soluble carbohydrate is present in the matrix.

22. The pellet according to claim 21, wherein the at least one water-soluble carbohydrate is selected from the group consisting of dextrin and maltodextrin.

23. The pellet according to claim 22, wherein the particle size is between 200 and 1,500 $\mu$m.

24. A pellet in which, in a homogeneous discrete distribution, at least one oily oxidation-sensitive component is encapsulated without a core in a matrix which, in addition to a starch, comprises at least one water soluble polysaccharide as film-forming agent and whereby said pellet has a particle size of at least 100 $\mu$mm.

25. The pellet according to claim 24, wherein the water-soluble film-forming polysaccharide is present at at least 0.5% by mass.

26. The pellet according to claim 24, wherein the oily oxidation-sensitive component is present at at least 15% by mass.

27. The pellet according to claim 24, wherein it has a particle size of at least 300 $\mu$m.

28. The pellet according to claim 24, wherein the water-soluble polysaccharide is hemicellulose and/or a modified starch.

29. The pellet according to claim 24, wherein at least one non-water-soluble carbohydrate is present in the matrix.

30. The pellet according to claim 29, wherein the non-water-soluble carbohydrate is a starch and/or a cellulose component.

31. The pellet according to claim 30, wherein the non-water-soluble carbohydrate is a cereal starch, microcrystalline cellulose, malt starch or a mixture thereof.

32. The pellet according to claim 24, wherein mono-, di- or trisaccharides are present in the matrix.

33. The pellet according to claim 24, wherein the oily component is one of an aromatic fruit oil and a fruit oil extract.

34. The pellet according to claim 24, wherein the active component is a coloring.

35. The pellet according to claim 25, wherein the active component is a flavoring.

36. The pellet according to claim 24, wherein the active component is an unsaturated fatty acid.

37. The pellet according to claim 24, wherein the active component is an active pharmaceutical compound or comprises an active pharmaceutical compound.

38. The pellet according to claim 24, wherein the active component is an insecticide/biocide.

39. The pellet according to claim 24, wherein the active component is soluble or dispersible in an oily component.

40. The pellet as claimed in claim 24, wherein the oily oxidation-sensitive component occupies a volume of at least 10% in the pellet.

41. The pellet according to claim 24, wherein the water content is less than 10% by mass.

42. A process for producing pellets in which at least one oily component is present in a matrix in encapsulated form without a core alone, comprising:

producing an aqueous emulsion which, in addition to at least one oily component, comprises at least one water-soluble polysaccharide as film-forming agent, in which emulsion the oily component is present in finely divided form, and adding a matrix-forming substance or mixture of substances to this emulsion to set a doughy consistency and pellets are produced therefrom.

43. The process according to claim 42, wherein the pellets are produced by extrusion.

44. The process according to claim 42, wherein the pellets are produced by direct pelleting.

45. The process according to claim 42, wherein the polysaccharide used for producing the emulsion is hemicellulose and/or modified starch.

46. The process according to claim 42, wherein the emulsion is produced in two stages, a homogenization at elevated pressure being carried out in a second stage.

47. The process according to claim 43, wherein, following the extrusion, the pellets are rounded.

48. The process according to claim 42, wherein the pellets are redried.

49. The process according to claim 42, wherein the pellets are provided with a protective coating.

50. A process for producing pellets in which at least one oily component is present in a matrix in encapsulated form without a core alone, comprising:

producing an aqueous emulsion which, in addition to at least one oily component, comprises at least one water-soluble polysaccharide as a film-forming agent, and at least one water-soluble carbohydrate as a matrix-forming substance, and producing pellets from the aqueous emulsion by direct pelleting.

51. The process according to claim 50, wherein the at least one water-soluble carbohydrate is selected from the group consisting of dextrin and maltodextrin.

52. The process according to claim 50, wherein the at least one water-soluble polysaccharide is soybean-based cellulose.

53. The process according to claim 50, wherein the emulsion is produced in two stages, a homogenization at elevated pressure being carried out in a second stage.

54. The process according to claim 50, wherein the pellets produced have a particle size of between 250 and 355 $\mu$m.

55. The pellet according to claim 1, wherein the oily oxidation-sensitive component is a volatile oil.

* * * * *